(12) United States Patent
Beck et al.

(10) Patent No.: US 8,561,822 B2
(45) Date of Patent: Oct. 22, 2013

(54) MULTI-GALLON CAPACITY BLOW MOLDED CONTAINER

(75) Inventors: Martin Beck, Amherst, NH (US);
Dennis Connor, Merrimack, NH (US);
Kim Lufkin, Auburn, NH (US); James Kowalczyk, Amherst, NH (US)

(73) Assignee: Devtec Labs, Inc., Amherst, NH (US)

( * ) Notice: Subject to any disclaimer, the term of this patent is extended or adjusted under 35 U.S.C. 154(b) by 0 days.

(21) Appl. No.: 13/190,050

(22) Filed: Jul. 25, 2011

(65) Prior Publication Data

US 2013/0026128 A1  Jan. 31, 2013

(51) Int. Cl.
*B65D 90/02* (2006.01)

(52) U.S. Cl.
USPC ........... 215/382; 215/370; 215/378; 215/379; 215/384; 220/669; 220/670; 220/671; 220/672; 220/673; 264/239

(58) Field of Classification Search
USPC .......................... 215/382, 370, 378, 379, 384; 220/669–673, 675
See application file for complete search history.

(56) References Cited

U.S. PATENT DOCUMENTS

| | | | | |
|---|---|---|---|---|
| 4,170,622 A | * | 10/1979 | Uhlig | 264/520 |
| 4,520,936 A | * | 6/1985 | Lyons | 215/375 |
| 4,589,560 A | * | 5/1986 | Harris, Jr. | 215/376 |
| 4,890,757 A | * | 1/1990 | Robbins, III | 220/675 |
| 5,337,909 A | * | 8/1994 | Vailliencourt | 215/381 |
| 5,598,941 A | * | 2/1997 | Semersky et al. | 215/384 |
| 5,690,244 A | * | 11/1997 | Darr | 215/382 |
| 5,746,339 A | * | 5/1998 | Petre et al. | 215/383 |
| 6,095,360 A | * | 8/2000 | Shmagin et al. | 215/382 |
| 6,161,713 A | * | 12/2000 | Krich | 215/384 |
| D459,234 S | | 6/2002 | Bourque et al. | |
| 6,575,321 B2 | | 6/2003 | Bourque et al. | |
| 6,749,075 B2 | | 6/2004 | Bourque et al. | |
| 6,974,047 B2 | | 12/2005 | Kelley et al. | |
| 7,017,763 B2 | * | 3/2006 | Kelley | 215/383 |
| 7,051,892 B1 | * | 5/2006 | O'Day, Jr. | 215/383 |
| 7,455,189 B2 | * | 11/2008 | Lane et al. | 215/381 |
| 7,469,796 B2 | * | 12/2008 | Kamineni et al. | 215/382 |
| 7,874,442 B2 | * | 1/2011 | Nievierowski et al. | 215/384 |
| 2006/0151425 A1 | | 7/2006 | Kelley et al. | |
| 2007/0045222 A1 | | 3/2007 | Denner et al. | |
| 2007/0075023 A1 | | 4/2007 | Wallace | |
| 2007/0170144 A1 | | 7/2007 | Lane et al. | |
| 2008/0223816 A1 | * | 9/2008 | Darr et al. | 215/382 |
| 2009/0283495 A1 | | 11/2009 | Lane et al. | |
| 2010/0006535 A1 | | 1/2010 | Ogg | |
| 2011/0132863 A1 | * | 6/2011 | Dorn | 215/10 |

\* cited by examiner

*Primary Examiner* — Andrew Perreault
*Assistant Examiner* — James M Van Buskirk
(74) *Attorney, Agent, or Firm* — Davis & Bujold, PLLC; Michael J. Bujold

(57) ABSTRACT

A multi-gallon capacity container comprising which comprises a substantially rectangular bottom portion having a chime and a plurality of base channels; a shoulder portion with a neck section for facilitating filling and discharging of liquid from the container and a plurality vertically extending shoulder channels; a body portion which seamlessly connects the bottom portion with the shoulder portion and having a plurality of spaced apart horizontal ribs and rib channels for increasing a lateral wall strength of the container. The container includes a first and second primary columns for increasing a top load strength of the container. Each primary column commences in the shoulder portion, extends substantially continuously along the shoulder portion, across the plurality of horizontal ribs, and terminates at the bottom portion. Each one of the horizontal ribs has a column feature formed therein which is aligned with one of the first and the second primary columns and forms a continuation of primary column from the shoulder portion to the bottom portion.

20 Claims, 16 Drawing Sheets

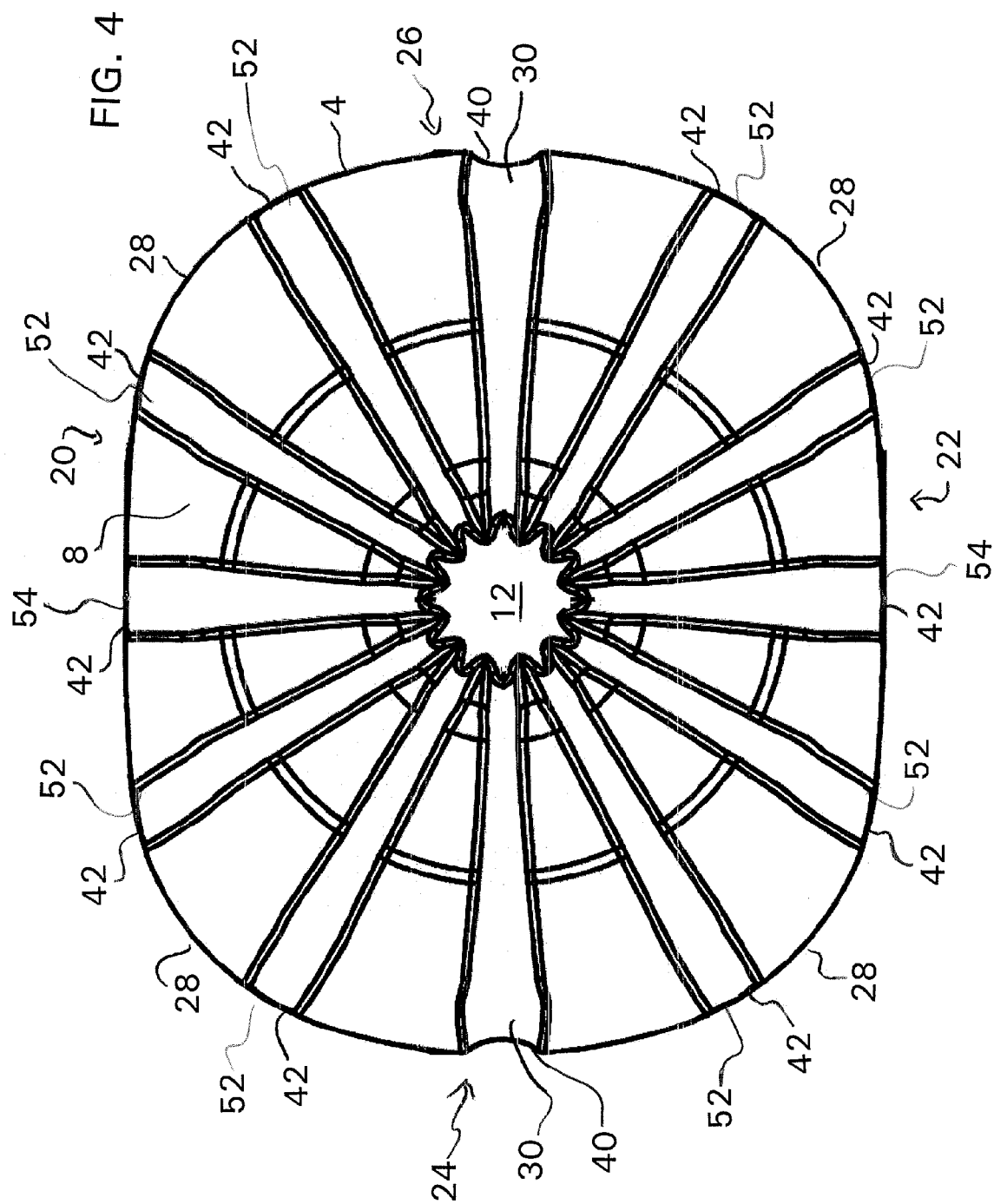

MULTI-GALLON CAPACITY BLOW MOLDED CONTAINER

FIELD OF THE INVENTION

The present invention relates to a single use multi-gallon stretch blown plastic container, generally having a transverse rectangular cross-section, that is typically used for storage of water and has both improved top load and lateral wall strength.

BACKGROUND OF THE INVENTION

Water bottles and containers for water coolers generally contain between about 3-7 gallons of fluid—typically about 4 or 5 gallons of filtered or purified water. The water bottles are normally installed on the water cooler in an inverted position, with the neck of the water bottle being received by a mating receptacle of the water cooler and the neck generally supporting a majority of the weight of the water bottle. In order to dispense water from the water cooler, a standard button or handle of the water cooler is depressed or otherwise actuated in a conventional manner, which opens a conventional flow valve allowing the water, contained within an internal cavity of the water bottle, to flow out of the internal cavity due to gravity. With the valve open, the weight of the column of water in the water bottle forces the water out through the opening in the neck of the water bottle and into the water cooler for dispensing to the consumer. As the water flows out of the internal cavity of the water bottle, such flow gradually reduces the total volume of the water contained within in the water bottle, and thereby normally creates a vacuum within the internal cavity the water bottle.

As water continues to be dispersed from the water bottle, the internal vacuum of the internal cavity continues to increase up into the point that either a replacement volume of air is permitted to enter into the internal cavity of the water bottle to relieve the created vacuum, or the side wall of the water bottle eventually commences collapsing radially inwardly, or possibly both events occur at about the same time. The created internal vacuum and the associated inwardly pushing force of the atmospheric pressure on the lateral walls of a water bottle can compromise the structural integrity of the water bottle, causing the side wall of the water bottle to bend, crimp and/or crumple inward, and potentially causing a leak or a fracture in the exterior surface of the water bottle or possibly causing the water bottle to become dislodged with the water cooler.

It is to be appreciated that water bottles with a circular transverse cross-section are generally more robust in withstanding the higher internal vacuums created within their internal cavity, as their circular side wall has a tendency of dissipating and/or dispersing this negative pressure more evenly throughout the circular sidewall. However, water bottles or containers having a circular cross section are less efficient for both package as well as shipping, in comparison to water bottles which have a generally square or rectangular transverse cross section.

Additionally, when packing and shipping filled water bottles, the water bottles must have sufficient top load strength in order to permit stacking of pallets of the water bottles, one on top of the other, in order to minimize the associated shipping costs. That is, filled water bottles are typically loaded on a pallet and then the pallets containing the plurality of water bottles are stacked either two or three pallets high, e.g., either one or two additional pallets are stacked on top of the base pallet containing a plurality of water bottles, during shipping from the bottling facilitate to the distributor or the end consumer. Such stacking of the pallets, one on top of the other, in combination with vertical undulations which normally occur during shipment and/or transportation, can create significant vertical compressive forces on the water bottles, and especially for the water bottles located on the base pallet of the stack of pallets. These vertical compressive forces can be sufficiently high so as to collapse the pallet and/or compromise the structural integrity of the water bottle, possibly causing one or more of the water bottles to bend, crimp and/or crumple inward or outward thereby causing a leak or a fracture in the wall of the water bottle(s) and/or significant distortion of the water bottle(s) thereby rendering the water bottle(s) potentially generally unfit for sale upon reaching the consumer.

Assuming the mass of the blow molded bottle is to remain the same, it is to be appreciated that typically any bottle design changes which improve lateral wall strength will typically weaken the top loading strength of the water bottle which makes the water bottle more susceptible to failure during transit. Conversely, any typical bottle design changes which improve the top loading strength of the water bottle will typically weaken the lateral wall strength of the water bottle, thereby making the water bottle more susceptible to failure as a result of the internal vacuum created when a consumer dispenses water from the water bottle using a conventional water cooler. Both of the above underscore the complexity in attempting to design a water bottle which addresses both of the above noted concerns, while still resulting in a water bottle which has both sufficient top load strength as well as lateral wall strength.

As is well known in the art, the incorporation of one or more horizontal annular ribs and other annular features will typically improve the lateral wall strength of the container, while the incorporation of one or more vertically extending ribs, columns or other vertical features will generally improve the top load strength of the container.

SUMMARY OF THE INVENTION

Wherefore, it is an object of the present invention to overcome the above mentioned shortcomings and drawbacks associated with the prior art.

Another object of the present invention is to provide a robust stretch blown or blow-molded multi-gallon water bottle or container, having a generally rectangular footprint, for use transporting and dispensing water from the water bottle or container via use of a conventional water cooler.

A further object of the present invention is to utilize a substantially rectangular footprint so as to increase the packing density of the water bottles or containers, to a density of about 20 to 30 water bottles/containers per pallet, in comparison to water bottles or containers which have a substantially circular footprint.

Another object of the invention is to provide a water bottle or container which improves both the top loading strength of the water bottle or container, so that the water bottle or container is less susceptible to failure during transportation and/or storage, while also improving the lateral wall strength of the water bottle or container so that the water bottle or container is less susceptible to failure as a result of the internal vacuum created within the water bottle or container when a consumer is removing a desired quantity of water from the water bottle or container via a conventional water cooler.

Still another object of the present invention is to provide a pair of opposed substantially vertical and continuous primary columns which each extend from adjacent the neck section of the water bottle or container, along one vertical sidewall of the water bottle or container and across the base of the water bottle or container to the central indentation or chime, so as to improve top load strength of the water bottle or container.

A still further object of the invention is to provide four substantially vertical and continuous secondary columns, each extending from the neck section of the water bottle or container, generally along each of the four corner sections of the substantially rectangular water bottle or container, and across the base of the water bottle or container to the centrally located push-up or chime which further assist with improving the top load strength of the water bottle or container.

Yet another object of the invention is to provide to a pair of opposing, substantially vertical and continuous tertiary columns, each extending from the neck section of the water bottle or container, along each opposed front and rear surface of the water bottle or container, and across the base of the water bottle or container to the centrally located push-up or chime, which still further assist with improving the top load strength of the water bottle or container.

Yet another object of the present invention is to provide a plurality of annular reinforcing ribs, annular valleys' and other horizontally extending annular features which improve the lateral wall strength of the water bottle or container and preferably only intermittently interrupt the primary, the secondary and/or the tertiary columns, in a minor fashion, so as not to significantly compromise the top load strength of the water bottle or container provided by the primary, the secondary and the tertiary columns. It is to be appreciated that selected sections of the plurality of annular reinforcing ribs, annular valleys and other horizontally extending annular features are vertically positioned or aligned with respect to the primary, the secondary and the tertiary vertical columns so as, in essence, to form a continuation of the primary, the secondary and the tertiary vertical columns and thereby the plurality of annular reinforcing ribs, annular valleys and other horizontally extending annular features cooperate with and assist the primary, the secondary and the tertiary columns with improving the top load strength of the water bottle or container while also improving the lateral strength of the water bottle or container.

Still another object of the present invention is to provide a plurality of spaced apart vertically extending rib supports, provided and accommodated within the annular valleys located between adjacent horizontal annular reinforcing ribs. These vertically extending rib supports are located within and generally spaced from one another along a circumference of the annular valleys so as to constantly maintain the vertical spacing of the horizontal annular reinforcing ribs from one another. The plurality of spaced apart vertically extending rib supports also assist with improving the top load strength of the water bottle or container and thereby resist collapse of the main body section of the water bottle or container.

The present invention also relates to a multi-gallon capacity blow molded container comprising: a substantially rectangular bottom portion having a chime, and the bottom portion having a plurality of base channels; a shoulder portion having a closeable neck section for facilitating filling and discharging of liquid from the container, and the shoulder portion having a plurality vertically extending shoulder channels; a body portion connecting the bottom portion with the shoulder portion, and the body portion having a plurality of spaced apart horizontal ribs and a plurality of annular rib channels for increasing a lateral wall strength of the container; wherein the container includes a first and second primary columns for increasing a top load strength of the container, and each primary column commences in the shoulder portion, extends substantially continuously along the shoulder portion, vertically across the body portion and the plurality of horizontal ribs, and the bottom portion and terminates at the bottom portion, and each one of the horizontal ribs having a column feature formed therein which is aligned with one of the first and the second primary columns so as to form substantially continuous primary column from the shoulder portion to the bottom portion.

BRIEF DESCRIPTION OF THE DRAWINGS

The invention will now be described, by way of example, with reference to the accompanying drawings in which:

FIG. 4 is a bottom plan view of the container of FIG. 1;

DETAILED DESCRIPTION OF THE INVENTION

Figure 1:
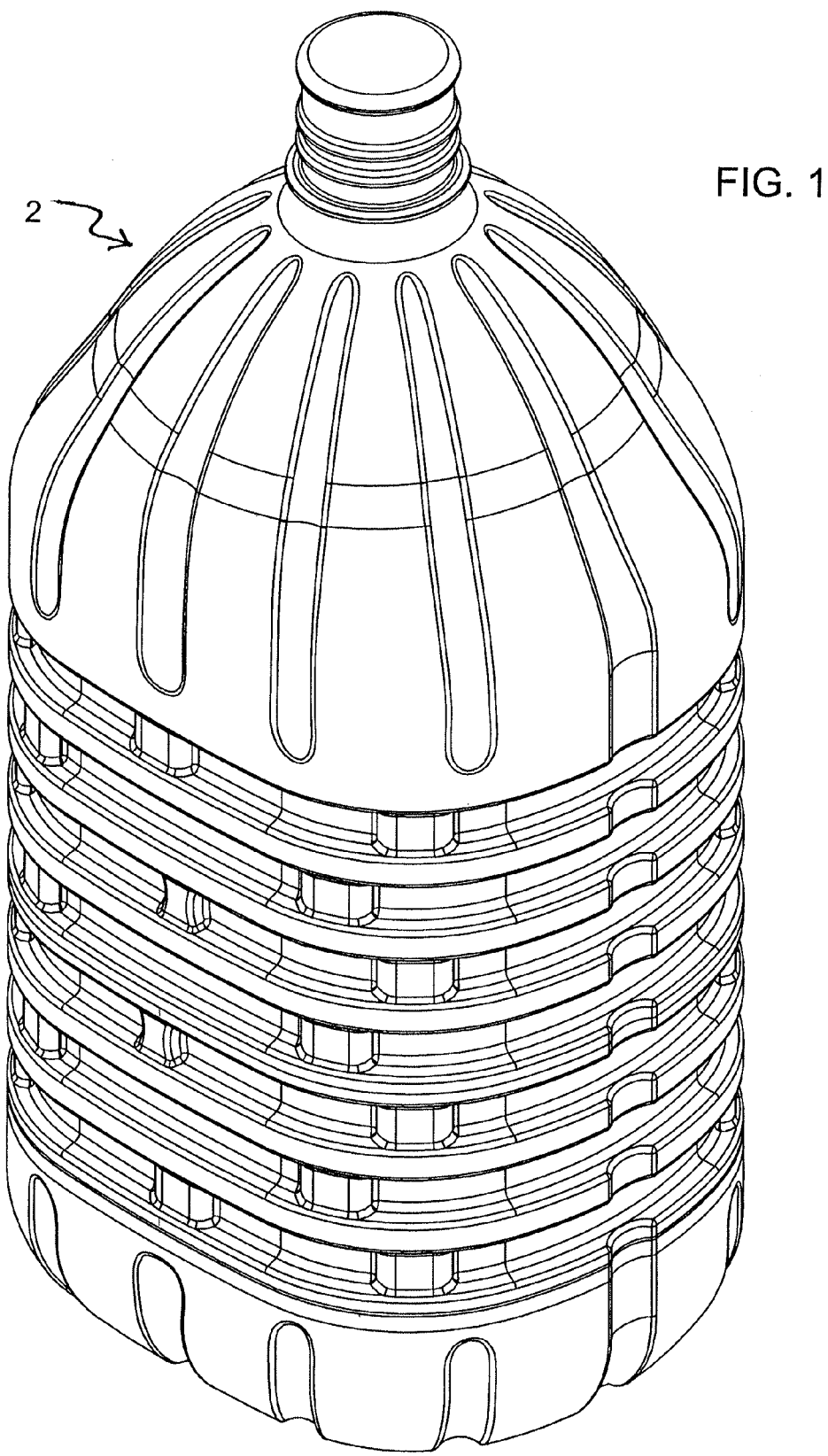
FIG. 1 is a top, front right side isometric view of a container according to the invention.

Turning now to FIGS. 1-5, a detailed description concerning the various components of a 4-gallon blow-molded water bottle or container, according to the present invention, will now be provided. As shown in those Figures, the 4-gallon stretch blow-molded water bottle or container 2 comprises a bottom portion 4 having a substantially rectangular configuration with generally curved or arcuate corner sections. The bottom portion 4 has a substantially planar vertical sidewall section 6 and a substantially planar base 8, with an arcuate transition 10 seamlessly interconnecting the sidewall section 6 with the base 8. Preferably the arcuate transition 10 has a radius of curvature of between about 3.5 and about 6.5 inches, and more preferably a radius of curvature of about 5 inches. As is conventional in the art, an inwardly push-up or chime 12 is located in the central region of the base 8. It is to be appreciated that the base 8 of the water bottle or container 2 is design to be sufficiently rigid and robust so that the integrity of the base 8 is not in anyway compromised during transportation, storage or dispensing of water from the water bottle or container 2.

A shoulder portion 14 of the water bottle or container 2 is located vertically above and coincident with the bottom portion 4. The shoulder portion 14 has a neck section 16 which defines a closable and sealable access opening 17 within a topmost end of the water bottle or container 2 which permits filling of the water bottle or container 2 with a desired liquid, e.g., water, as well as dispensing of the liquid from the water bottle or container 2. The opening 17 within the neck section 16 is coincident with the inwardly push-up or chime 12 formed in the bottom portion 4. The neck section 16 typically has between two to four spaced apart annular features or rings 19 which completely circumscribe and encircle the outer circumference of the neck section 16. Once the water bottle or container 2 is filled with the desired liquid, such spaced apart annular features or rings 19 are surrounded by and engage with a removable cover or cap (not shown) to facilitate a removable sealing of the opening of the water bottle or container 2 to retain the liquid contents therein. Alternatively, the spaced apart annular features or rings 19 may be replaced by a conventional threaded section for threadedly engaging with a threaded cap or cover. As is typical in the art, the wall thickness of the neck section 16 is generally much thicker than a remainder of the water bottle or container 2. That is, the neck section 16 generally has a wall thickness of about 0.100 inches while the remainder of the water bottle or container 2 generally has a minimum wall thickness of about 0.017 inches.

Figure 8A:
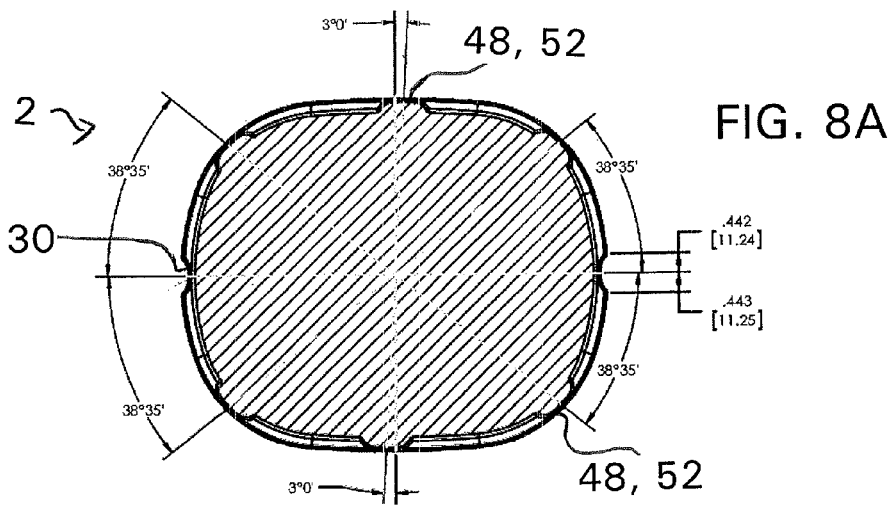
FIG. 8A is a diagrammatic cross-sectional view of the container along section line 8A-8A of FIG. 3.
Figure 8B:
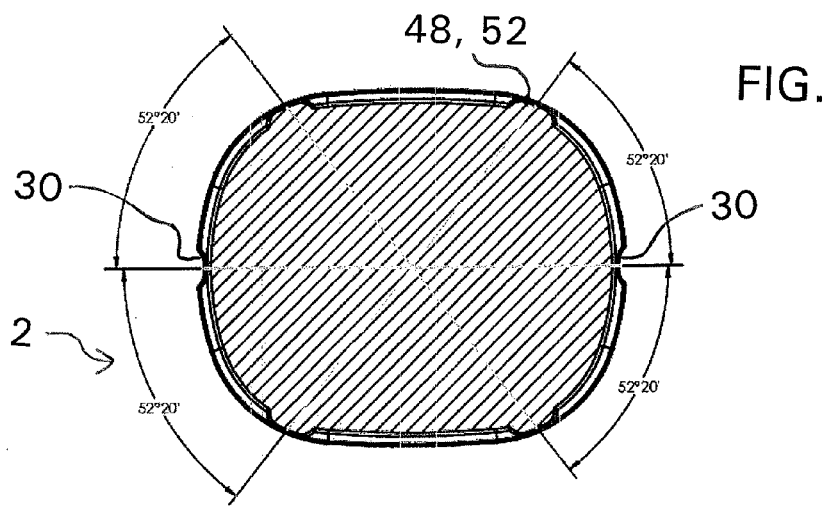
FIG. 8B is a diagrammatic cross-sectional view of the container along section line 8B-8B of FIG. 3.
Figure 8C:
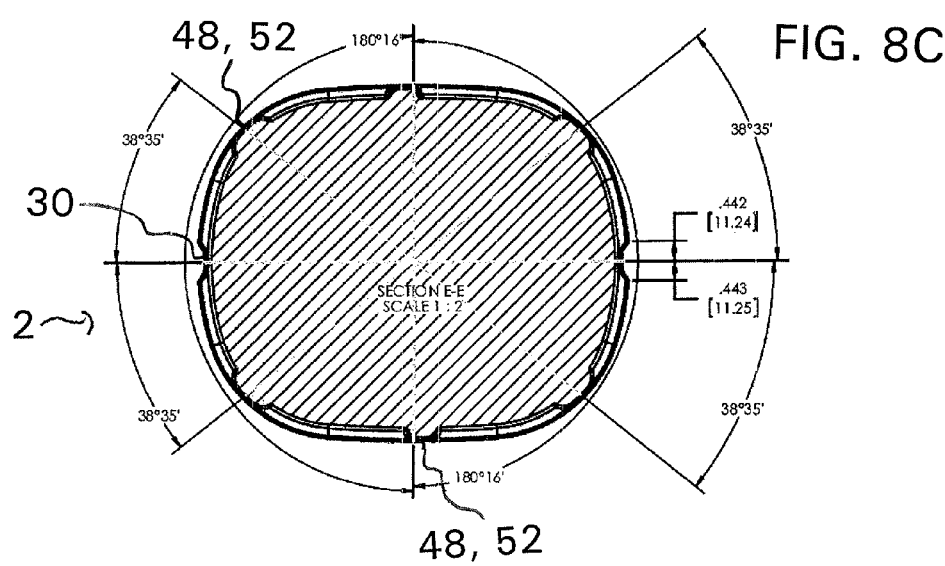
FIG. 8C is a diagrammatic cross-sectional view of the container along section line 8C-8C of FIG. 3.

A main body portion 18 of the water bottle or container 2 integrally and seamlessly interconnects the shoulder portion 14 with the bottom portion 4. The body portion 18 generally has a substantially rectangular transverse cross section (see FIGS. 8A, 8B and 8C) with opposed front and rear surfaces 20, 22 which are integral connected with opposed first and second sidewall surfaces 24, 26 by a pair of respective arcuate corner sections 28, which each provide a smooth, seamless and continuous transition between the front, the rear and the side surfaces 20, 22, 24 and 26 of the water bottle or container 2.

Figure 2:
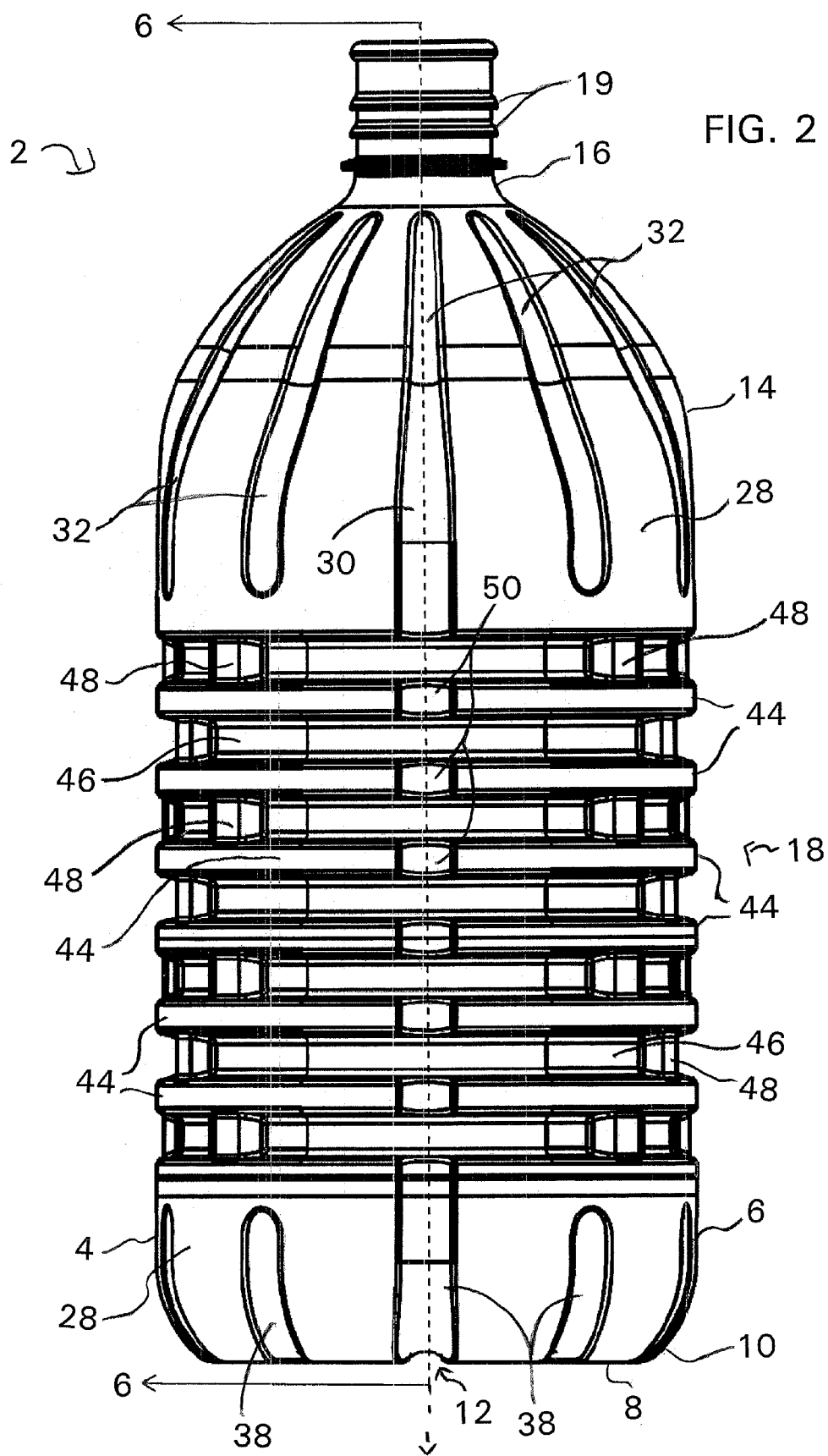
FIG. 2 is a right side elevation view of the container of FIG. 1.

Opposed vertically extending first and second primary columns 30 are formed into and extend along the respective first or second side surfaces 24, 26 of the water bottle or container 2. The first and the second primary columns 30 together combine with one another so as to extend substantially around an entirety of the vertical perimeter of the water bottle or container 2. That is, each primary column 30, as shown in FIG. 2, commences in the shoulder portion 14, at a location closely adjacent the neck section 16, and extends substantially continuously along and through the shoulder portion 14, vertically downward through and across a sidewall 24, 26 of the body portion 18, substantially bisecting the respective sidewall 24, 26, and across and through the sidewall section 6, the arcuate transition 10 and the base 8 of the bottom portion 4 until finally terminating at the inwardly push-up or chime 12. The vertically extending first and second primary columns 30 together define a plane which bisects the water bottle or container 2 into first and second mating halves.

The shoulder portion 14 preferably includes twelve substantially vertically extending shoulder channels 32 which are formed into the surface of the shoulder portion 14 of the water bottle or container 2. Each one of the twelve substantially vertically extending shoulder channels 32 commences directly adjacent to the neck section 16 and extends generally vertically downward toward the body portion 18. First and second opposed vertically extending shoulder channels 34 are coincident with and form a portion of the first and the second primary columns 30, and these two shoulder channels 34 both extend completely into a vertically upper region of the body portion 18, as shown in FIG. 2. It is to be appreciated that the other 10 remaining vertically extending shoulder channels 36 commence directly adjacent the neck section 16 and extend toward the upper region of the body portion 18, in a similar manner to the first and the second opposed vertically extending shoulder channels 34, but terminate prior to reaching the upper region of the body portion 18.

The bottom portion 4 also preferably includes twelve radially extending base channels 38 which are formed into the surface of the bottom portion 4 of the water bottle or container 2. Each one of the twelve extending base channels 38 commences within the inwardly push-up or chime 12 and initially extends generally vertically downward and radially outward toward the planar base 8 and the arcuate transition 10 and then vertically upward along the sidewall section 6 toward the body portion 18. First and second opposed vertically extending base channels 40 are coincident with and form a portion of the first and the second primary columns 30 and these two opposed base channels 40 both extend into the lower region of the body portion 18. Each of the other 10 remaining base channels 42 initially commence within the inwardly push-up or chime 12 and extend therefrom, in a similar manner to the first and the second opposed vertically extending base channels 40, but terminate prior to reaching the lower region of the body portion 18.

The first and the second primary columns 30 both have a radius of curvature between 0.500 inches and 1.000 inches, preferably about 0.750 inches, while the substantially vertically extending shoulder channels 32 each have a radius of curvature between about 0.500 inches and 1.000 inches, preferably about 0.675 inches and the base channels 38 each have a radius of curvature between 0.500 inches and 1.000 inches, preferably about 0.750 inches. An end of each of the radially extending base channels 38 is substantially vertically and axially aligned with a mating end of a respective substantially vertically extending shoulder channel 32 in the region where each respective channels 32, 38 terminates adjacent the body portion 18. It is to be appreciated that the above indicated values for the components of the shoulder portion and the base portion can vary from application to application and the above values are merely for providing guidance.

A plurality of spaced apart horizontally extending ribs 44, typically about six horizontal ribs but possibly more or less horizontal ribs, are formed within the body portion 18 of the water bottle or container 2, and each one of these horizontal ribs 44 extends around the entire perimeter of the water bottle or container 2 in a substantially uninterrupted fashion. That is, each one of the horizontal ribs 44 preferably has at most a pair of opposed column features 50 (e.g., a gradual curved indentation, a scalloped recess, a gradual curved protrusion, a recess, a protrusion. etc.) provided therein and each of these column features 50 is axially aligned with one of the first and the second primary columns 30 to thereby form a continuation thereof. It is appreciated that one, two, or three horizontal ribs 44 may have no column features 50, and thus extend substantially completely uninterrupted around the entire perimeter of the water bottle or container 2.

Each one of the horizontal ribs 44 is spaced and separated from an adjacent horizontal rib 44 by a corresponding annular valley or rib channel 46. According to this design, there are a total of seven annular valleys or rib channels 46 with a corresponding horizontal rib 44 being located between each adjacent pair of annular valleys or rib channels 46. Each one of these horizontal ribs 44 and the associated annular valleys or rib channels 46 assist with providing the water bottle or container 2 with a sufficient amount of lateral wall strength and stability so as to resist collapse of the water bottle or container 2 once an internal vacuum is created within the water bottle or container 2 upon dispensing of a desired quantity of water from the water bottle or container 2.

Each one of the gradual curved indentations or scalloped recesses 50 is located so as to be coincident with one of the first and the second primary columns 30 and thereby form a continuation thereof. As a result of such arrangement, each gradually curved indentation, scalloped recess or column feature 50 is vertically aligned with one another, as well as vertically aligned with the shoulder and the base channels 32, 38 of the first or the second primary column 30 which extends from the shoulder portion 14 to the bottom portion 4. Such vertical alignment of the curved indentations, scalloped recesses or column features 50 with one another and with the other components of the first or the second primary columns 30 in essence form a continuation of the first or the second primary columns 30 so that the top load strength of the water bottle or container 2, especially along the two opposed side surfaces 24 and 26 of the water bottle or container 2, is significantly increased.

The gradually curved indentations or scalloped recesses 50, formed or provided in the horizontal ribs 44, typically have a radius of curvature of between about 0.500 and 1.000 inches. It is to be appreciated that any other kind or type of vertical reinforcement and/or stiffening arrangement or configuration for the horizontal ribs 44, which facilitates forming a substantially rigid connection and/or extension of the first and the second primary columns 30 would be readily apparent to those skilled in the art and is considered to fall within the scope of the present invention.

As shown in FIGS. 2, 3, 6 and 7, the body portion 18 of the water bottle or container 2 includes a plurality of rib supports 48. Each one of the rib supports 48 is formed integrally within one of the annular valleys or the rib channels 46 and generally protrudes therefrom radially outward toward the horizontal ribs 44 so as to interconnect a sidewall of adjacent pairs of the horizontal ribs 44, and thereby the adjacent horizontal ribs 44, with one another. Each rib support 48 essentially functions so as to resist the horizontal ribs 44 from collapsing toward one another in the event that the water bottle or container 2 experiences a significant top load force. That is, each one of the plurality of rib supports 48 is, in essence, a vertical column which is located between adjacent pairs of the horizontal ribs 44 which assists with resisting collapse, e.g., vertical, of the front surface 20, the rear surface 22, and the side surfaces 24, 26 of the body portion 18 of the water bottle or container 2 and thereby assist with increases the overall top load strength of the water bottle or container 2.

An outer most surface of each one of the rib supports 48 is generally square or rectangular in shape and typically has a length of between 0.875 inches and 1.250 inches and a width of between 0.500 inches and 0.750 inches. The sidewalls of each one of the rib supports 48 generally gradually transitions and/or merges into the annular valleys or the rib channels 46. That is, each opposed sidewall of the rib supports 48 typically forms an angle of slightly greater than 90° with the associated annular valleys or the rib channels 46 and thus provides a relatively gradual transition into and from the associated annular valleys or the rib channels 46. It is to be appreciated that for certain applications, the rib supports 48 may form an angle of about 90° or less with the associated annular valleys or the rib channels 46 or may form an angle of significantly greater than 90° with the associated annular valleys or the rib channels 46.

Figure 3:
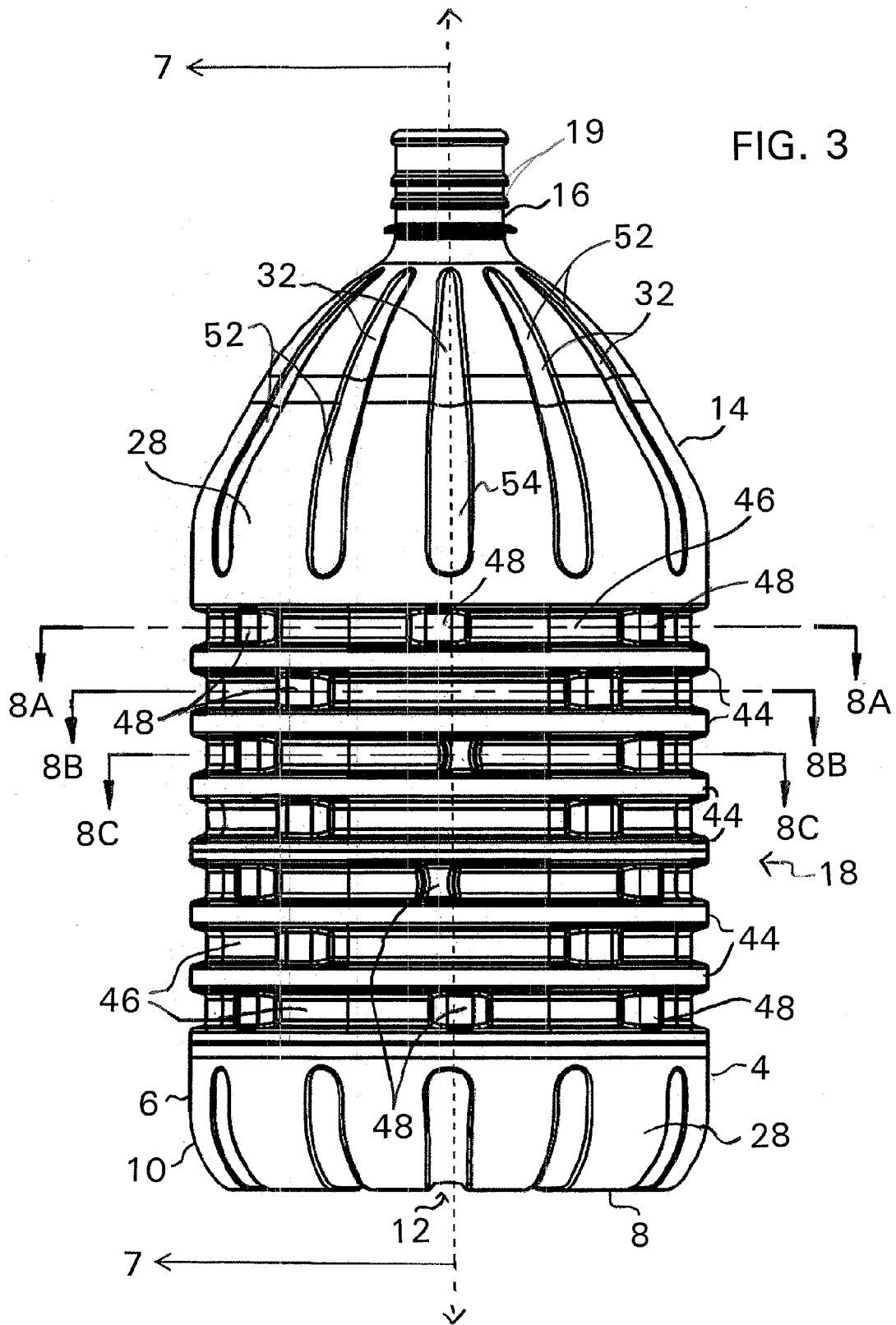
FIG. 3 is a front elevation view of the container of FIG. 1.

As shown in FIGS. 2 and 3, a rib support 48 is located, in each arcuate corner section 28, between each adjacent pair of horizontal ribs 44 as well as located between the uppermost horizontal rib 44 and the shoulder portion 14 and between the lowermost horizontal rib 44 and the base portion 4. In each arcuate corner section 28, however, the rib supports 48 located therein are typically staggered—i.e., vertically sequential rib supports 48 are generally not vertically aligned with one another (see FIGS. 2 and 3)—and are typically located between a pair of adjacent base channels 38 which are formed into the surface of the bottom portion 4 and extend toward a respective arcuate corner section 28 as well as between a pair of adjacent shoulder channels 32 which are formed into the surface of the shoulder portion 14 and extend toward a respective arcuate corner section 28. As a result of this arrangement, 1) the adjacent pairs of shoulder channels 32 of the shoulder portion 14 which extend toward each arcuate corner section 28, 2) the staggered rib supports 48 located within and vertically along each arcuate corner section 28, and 3) the adjacent pairs of base channels 38 of the bottom portion 4 which extend toward each arcuate corner section 28 all combined together with one another to form four corner section columns or secondary columns 52. That is, each secondary column 52 is formed and extends vertically along each one of the four arcuate corner sections 28 of the water bottle or container 2 to provide secondary top load support for the water bottle or container 2. Each one of the four secondary columns 52 thereby further increases the top load strength of the water bottle or container 2 in the arcuate corner sections 28, and thereby also improves the overall top load strength of the water bottle or container 2.

Figure 3A:
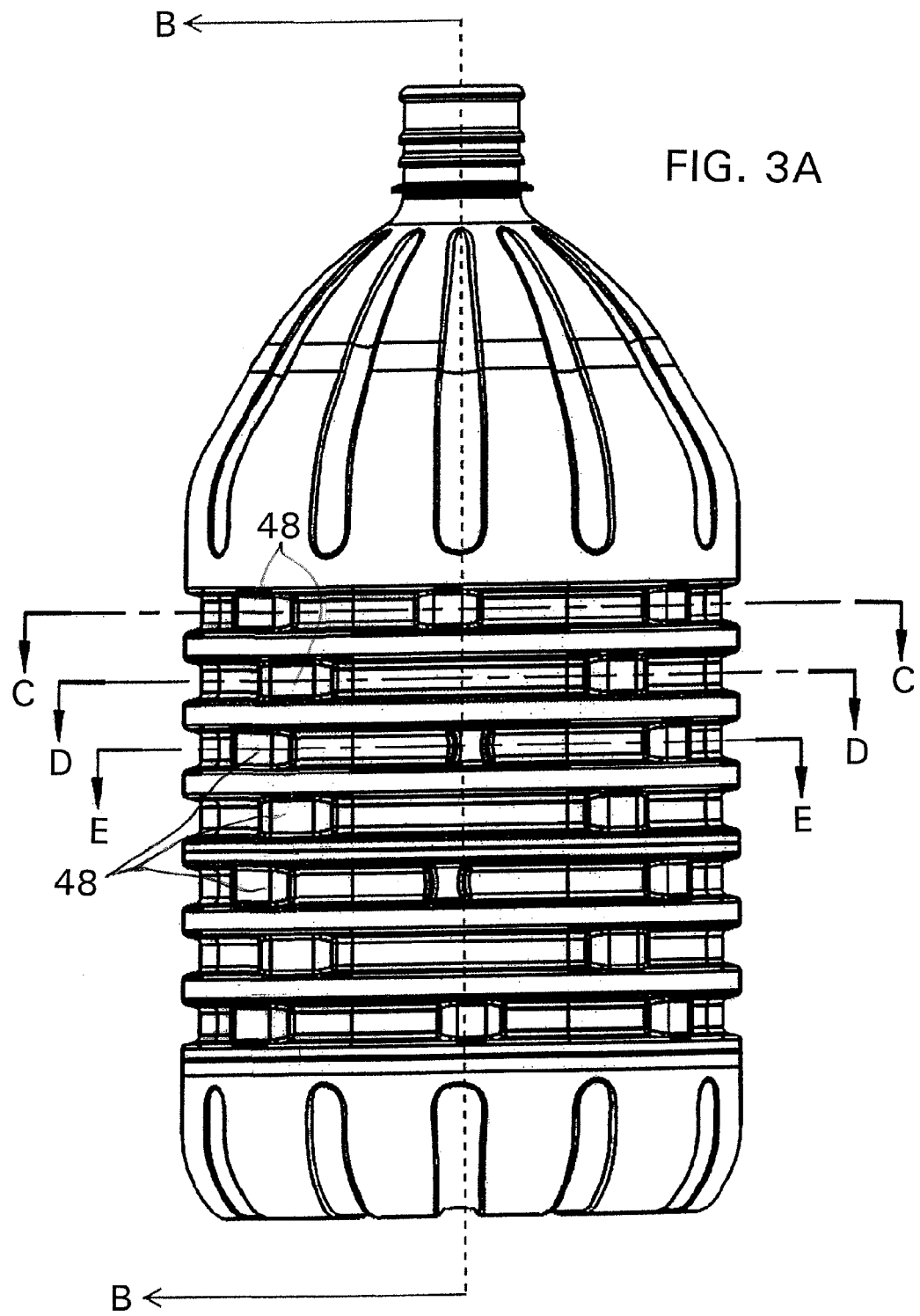
FIG. 3A is a partial diagrammatic front elevation view of the container of FIG. 1 showing a variation which has partial overlap of the rib supports in the corner section.
Figure 3B:
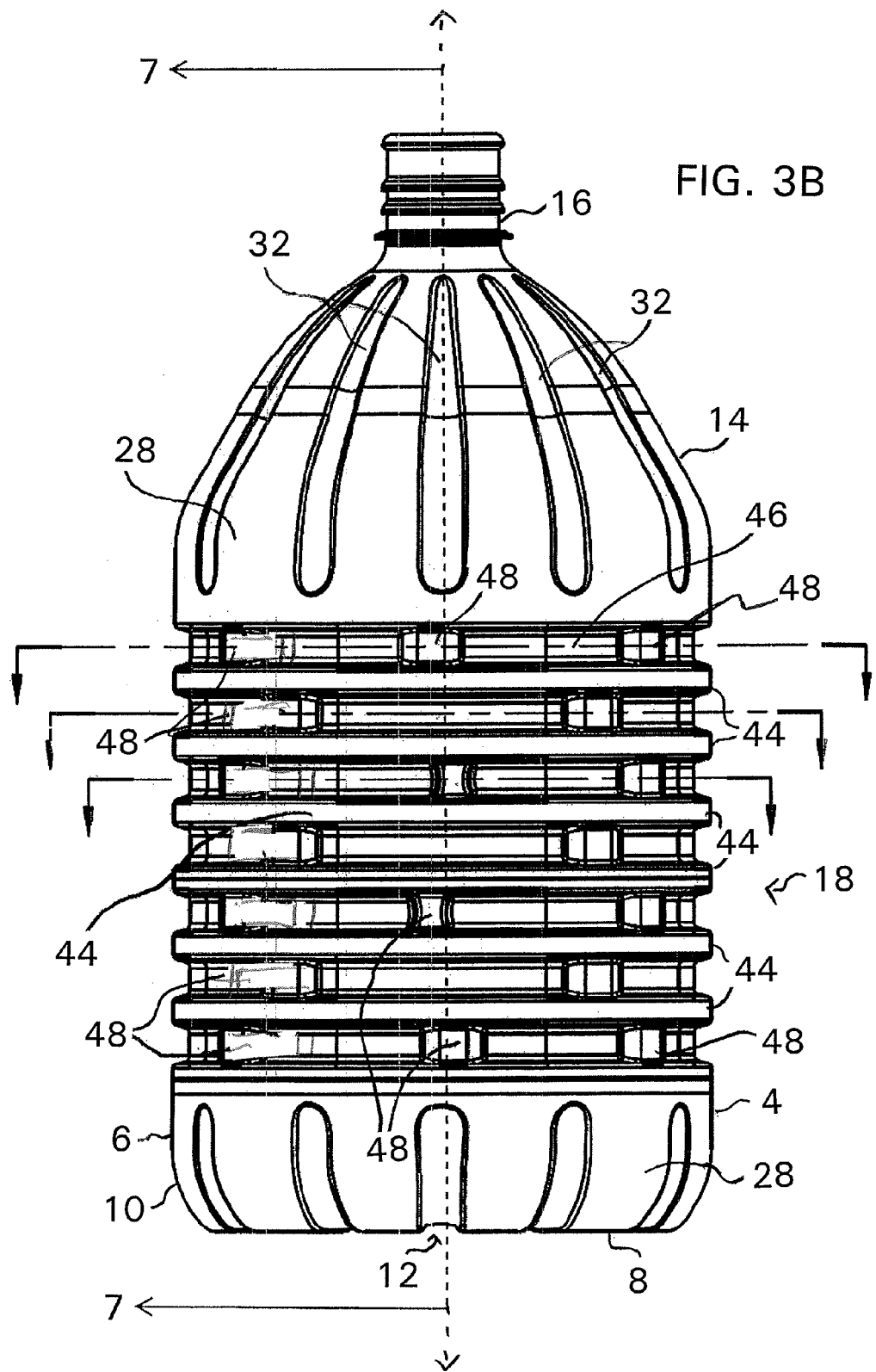
FIG. 3B is a partial diagrammatic front elevation view of the container of FIG. 1 showing a further variation in which the rib supports in the corner section are generally axially aligned with one another and located between a pair of shoulder and base channels.
Figure 3C:
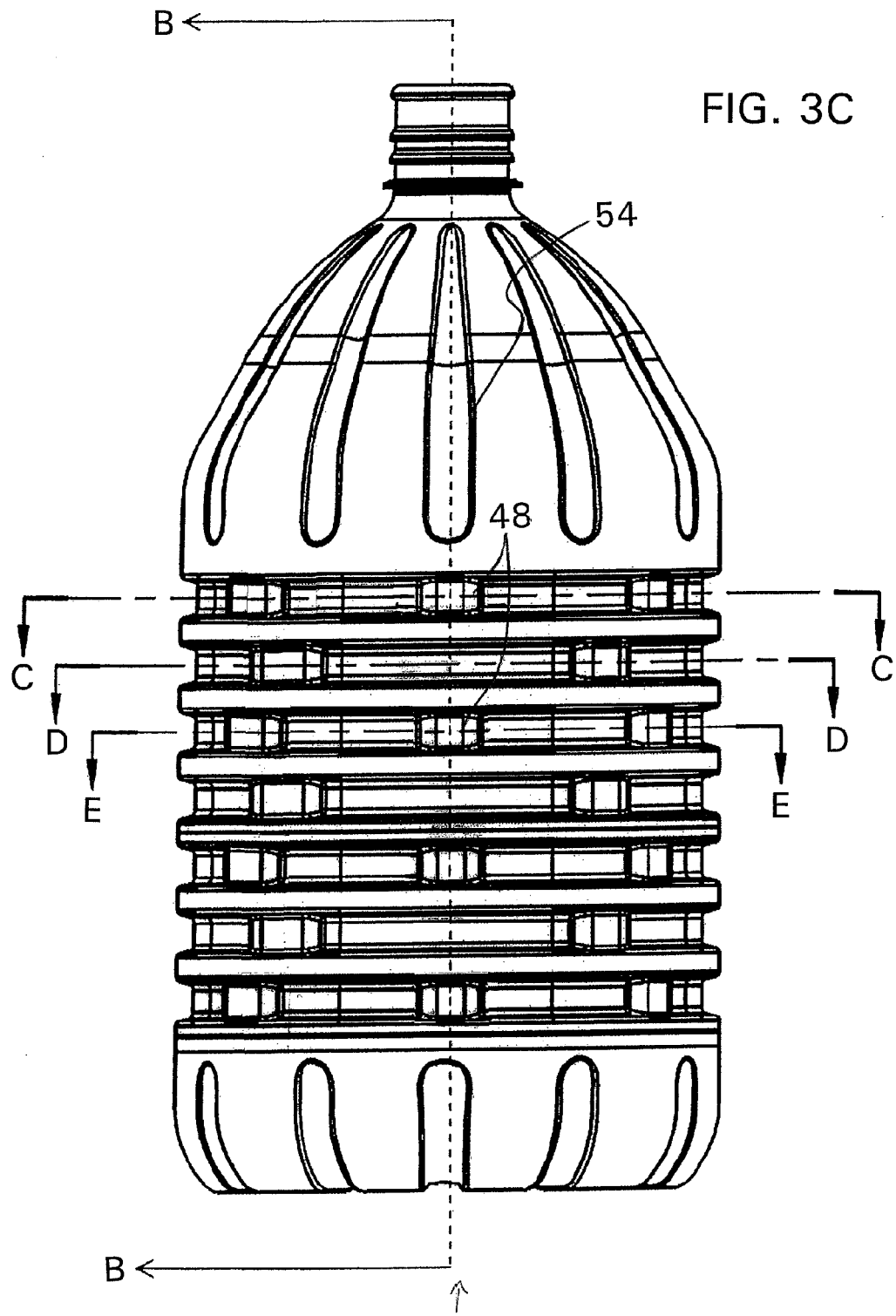
FIG. 3C is a partial diagrammatic front elevation view of the container of FIG. 1 showing a variation which includes alignment of the rib supports of the tertiary column.
Figure 3D:
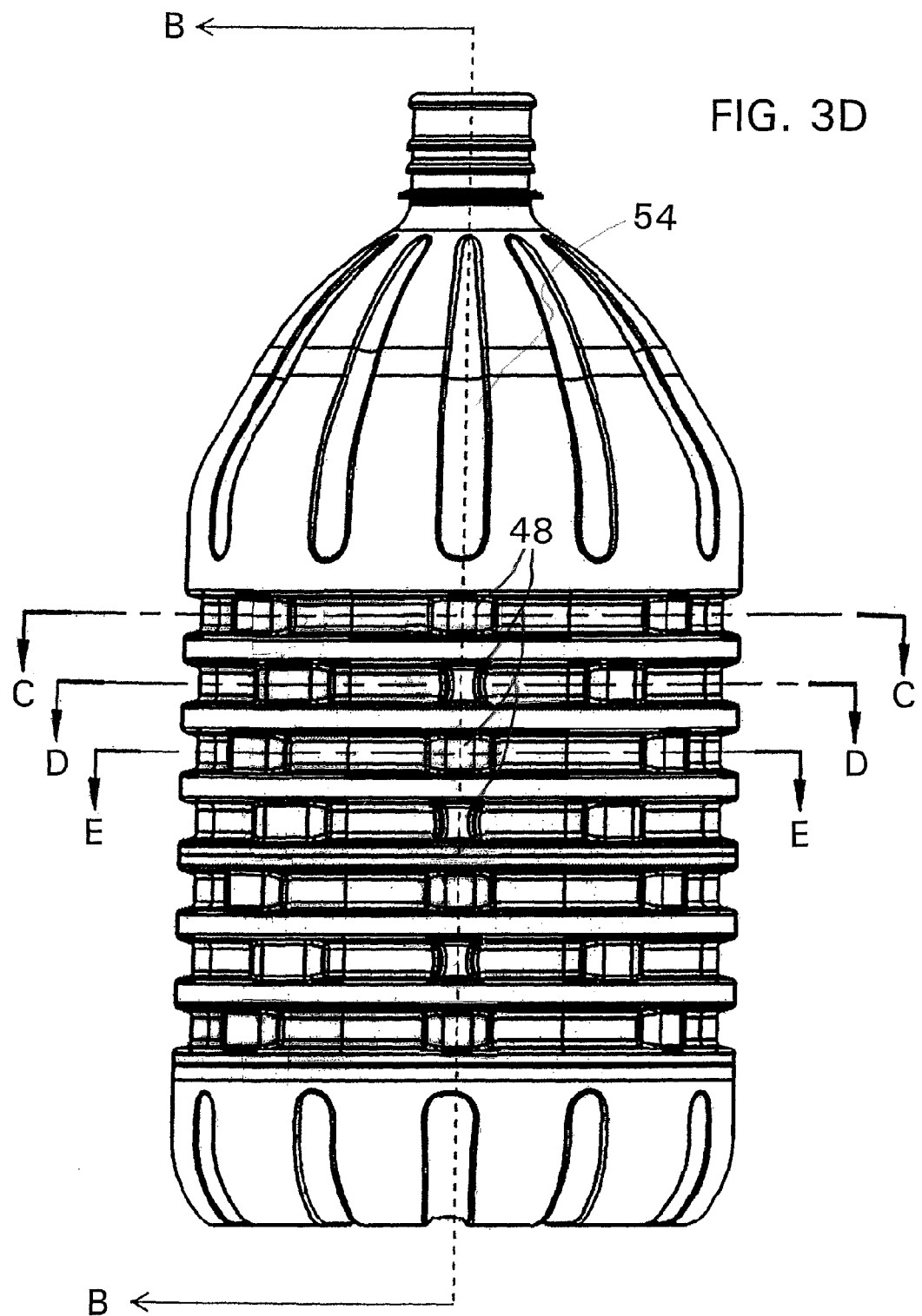
FIG. 3D is a partial diagrammatic front elevation view of the container of FIG. 1 showing a further variation in which a rib support is provide in each rib channel and all of the rib supports of the tertiary column are vertical aligned with one another.
Figure 5:
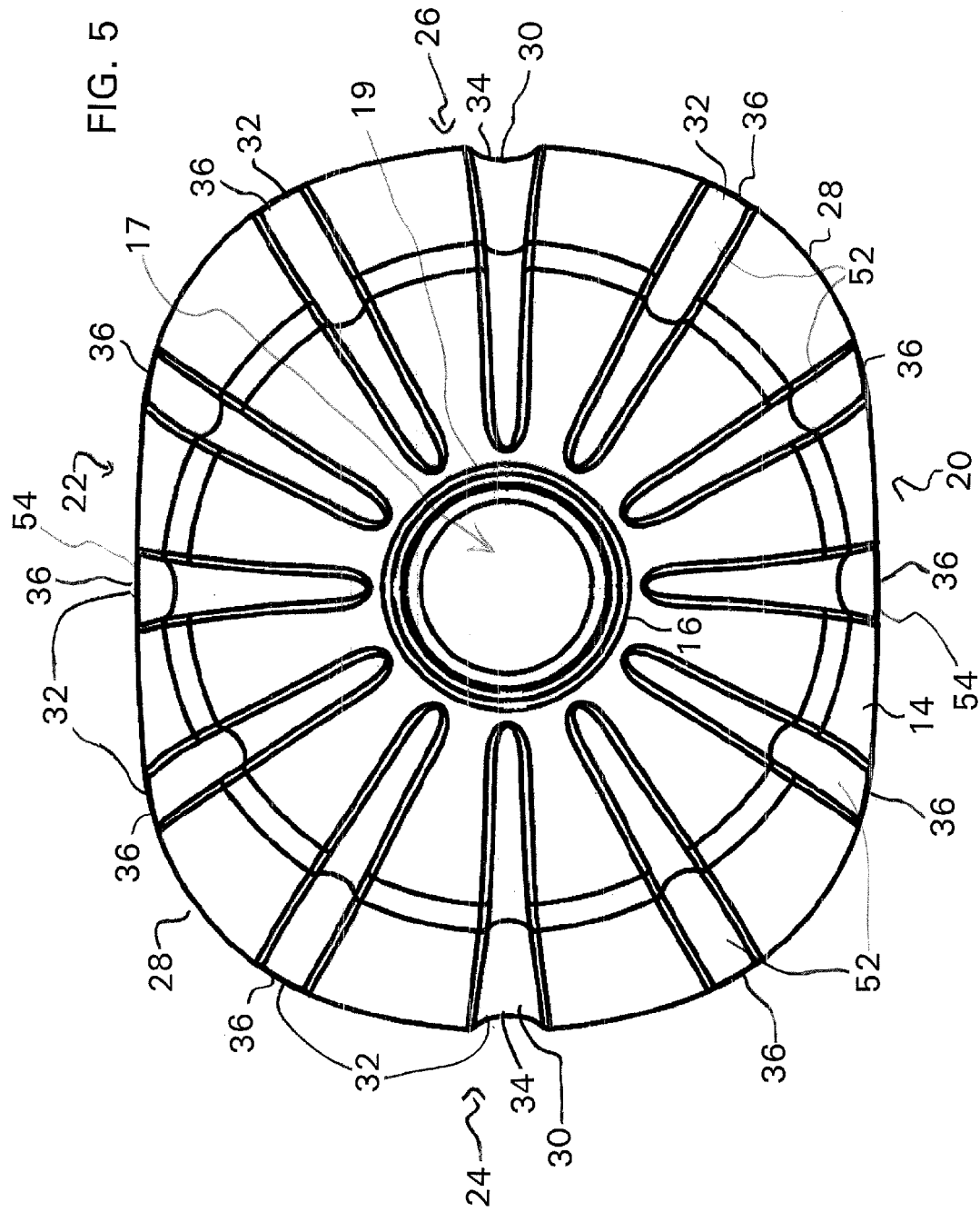
FIG. 5 is a top plan view of the container of FIG. 1.
Figure 6:
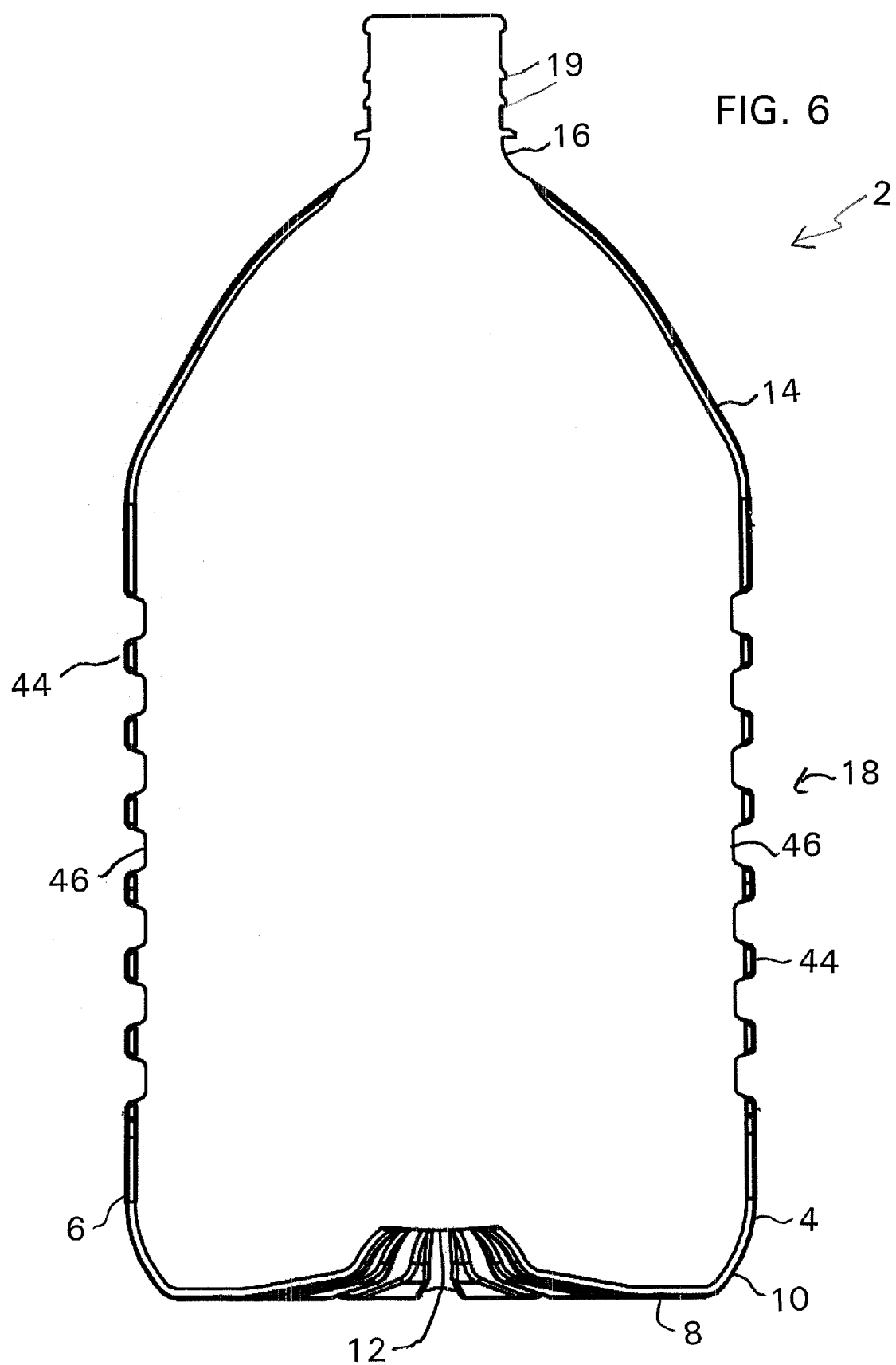
FIG. 6 is a diagrammatic cross-sectional view of the container along section line 6-6 of FIG. 2.
Figure 7:
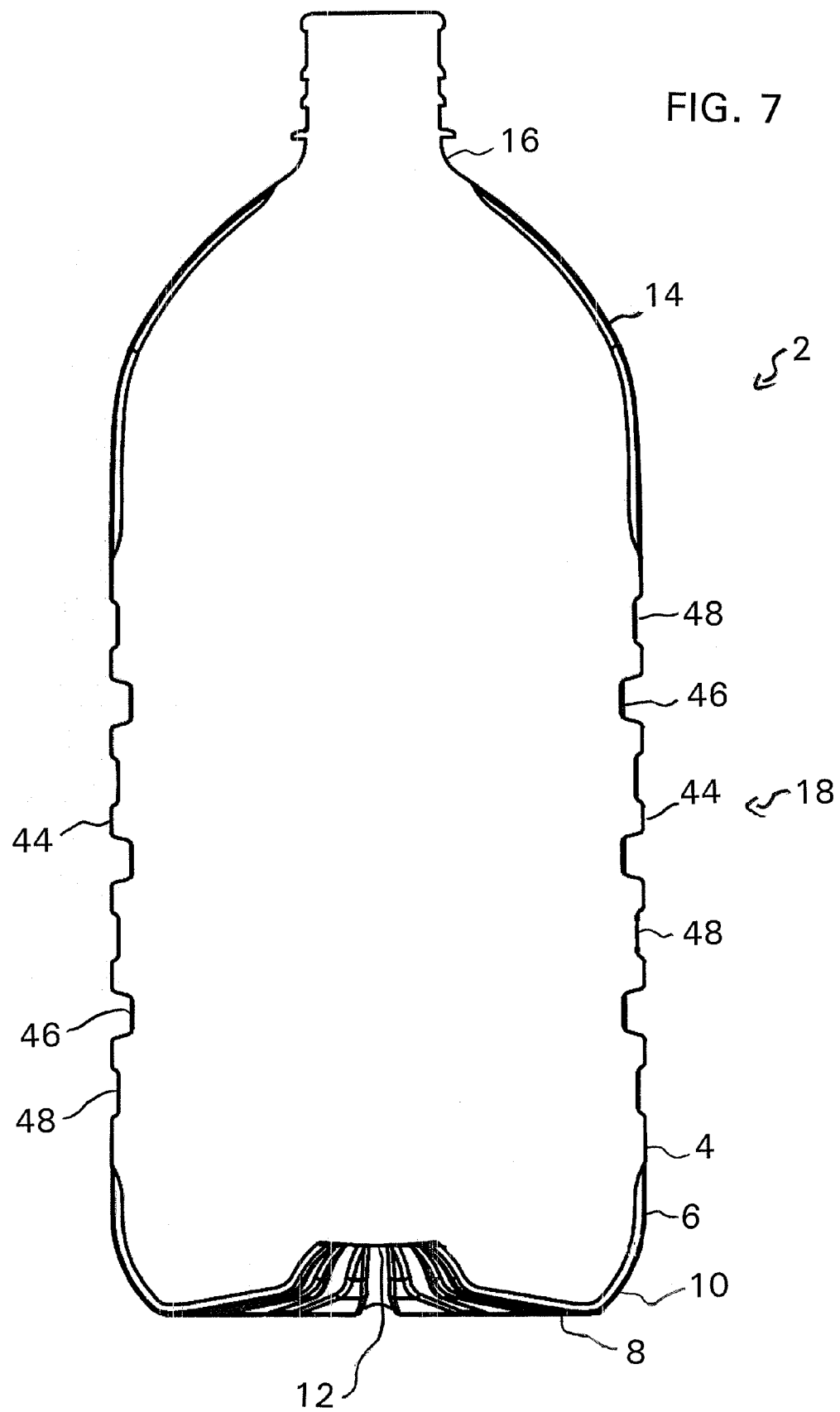
FIG. 7 is a diagrammatic cross-sectional view of the container along section line 7-7 of FIG. 3.

Turning to FIG. 3 for example, along each of the front surface 20 and the rear surface 22 of the water bottle or container 2, a rib support 48 is located between every other adjacent pair of the horizontal ribs 44, as well as being located between the uppermost horizontal rib 44 and the shoulder portion 14 and between the lowermost horizontal rib 44 and the base portion 4 of the water bottle or container 2. The rib supports 48 in the front and the rear surfaces 20, 22 may be slightly staggered, as shown in FIG. 3, or alternatively the rib supports 48 may each be vertically aligned with one another as shown in FIGS. 3C and 3D. The rib supports 48, which are located in the front surface 20 and the rear surface 22 of the water bottle or container 2, are typically vertically aligned with a respective base channel 38 formed into the surface of the bottom portion 4 and extending toward the respective front or the rear surface 22, 24, as well as aligned with the shoulder channel 32 formed into the surface of the shoulder portion 14 and extending toward the respective front or the rear surface 22, 24. As a result of this arrangement, 1) the shoulder channels 32 of the shoulder portion 14, which extend toward and substantially bisect each of the front and the rear surfaces 20, 22, 2) the staggered or aligned rib supports 48 located within the front and the rear surfaces 20, 22 of the body portion 18, and 3) the base channel 38 of the bottom portion 4, which extend toward and substantially bisects each of the front and the rear surfaces 20, 22, all combine together with one another to form two opposed tertiary columns 54, with each tertiary column 54 being formed in and extending along either the front or the rear surface 20, 22 of the water bottle or container 2. Each one of the two oppose tertiary columns 54 further increases the top load strength of the front and the rear surfaces 20, 22 of the water bottle or container 2, and thereby also improving the overall top load strength of the water bottle or container 2.

It is to be appreciated that each of the primary columns 30 can be wider, narrower, or the same width as the other shoulder and/or base channels 32, 38. In addition, the shoulder and the base channels 32, 38 can all be equal shapes, diameters and/or contours, or may have different shapes, diameters and/or contours.

Figure 2A:
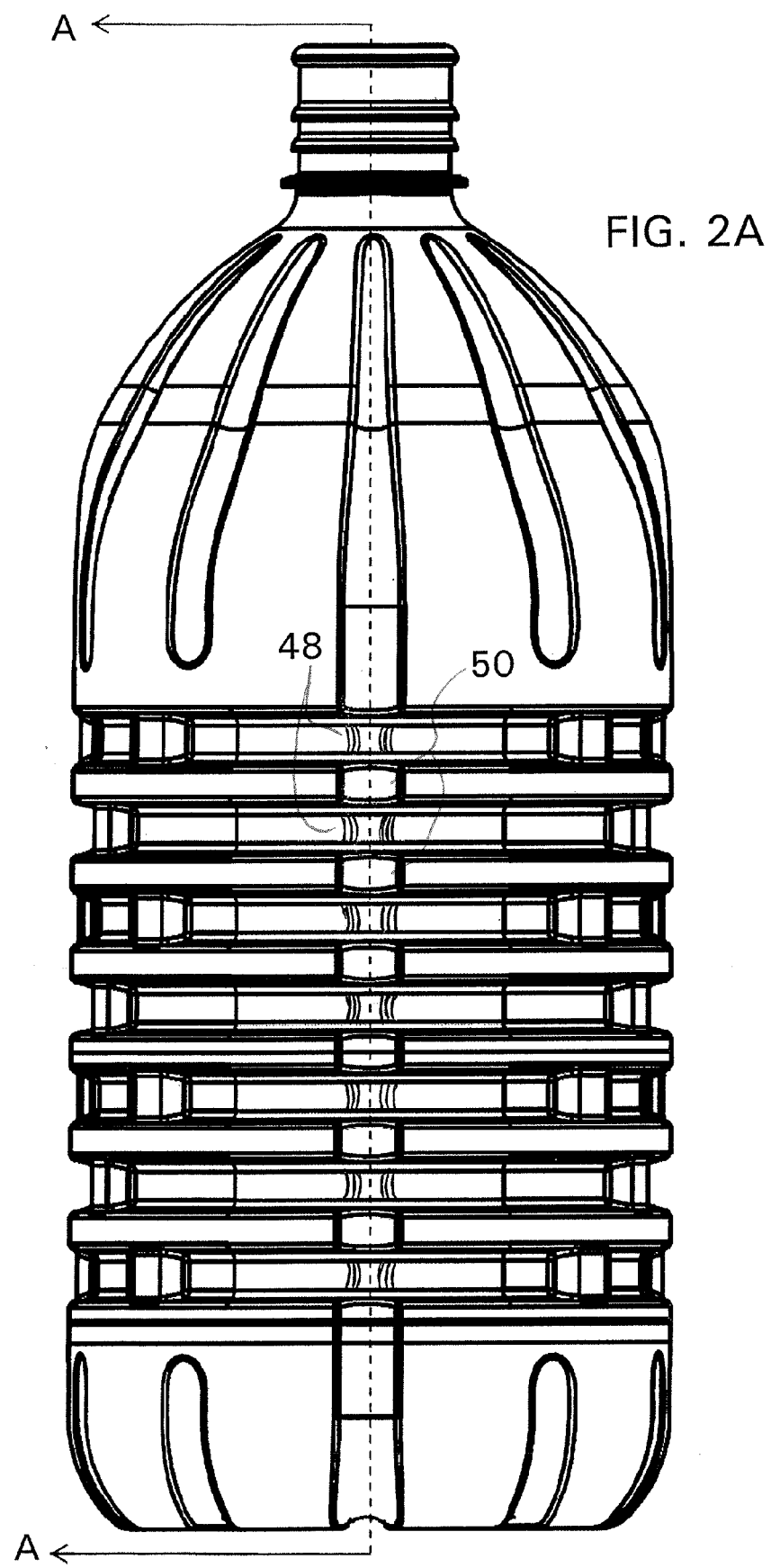
FIG. 2A is a partial right side elevation view of the container of FIG. 1 showing a variation thereof in which a rib support is provide in each rib channel and the rib supports are vertical aligned with one another and with the column features of the horizontal ribs.

If further top load strength for the water bottle or container 2 is desired, a rib support 48 may be located, on the two side surfaces 24, 26 between adjacent pair of horizontal ribs 44, as well as located between the uppermost horizontal rib 44 and the shoulder portion 14, and between the lowermost horizontal rib 44 and the base portion 4. These rib supports 48 would be vertically aligned with the gradual curved indentations or scalloped recesses 50 thereby to form uninterrupted first and second primary columns 30, as generally shown in FIG. 2A. In addition, in order to increase further the vertical strength of the rib support 48 in the arcuate corner sections 28, the annular width of the exterior surface of one or more of the rib supports 48 may be increased. Moreover, it is also conceivable that the staggered rib supports 48, in the arcuate corner sections 28, may at least partially overlap one another as generally shown in FIG. 3A. Alternatively, the rib supports 48, in the corner section 28, may be generally axially aligned with one another, as generally shown in FIG. 3B.

In the event that an improvement in the top load strength of the water bottle or container 2 is desired, particularly in the region of the tertiary columns 54, the rib supports 48 of the tertiary column 54 can be axially aligned with one another and with the shoulder and base channels 32, 38, as generally shown in FIG. 3C. If a still further increase in the top load strength of the water bottle or container 2 in the region of the tertiary columns 54 is desired, the rib supports 48 can be axially aligned with one another and a rib support 48 can be provided between each adjacent pair of the horizontal ribs 44, as generally shown in FIG. 3D.

As noted above, the rib supports 48 are provided between adjacent pairs of horizontal ribs 44 in order to resist collapse of the horizontal ribs 44 toward one another when the water bottle or container 2 experiences a significant top load force. As generally shown in the drawings, each one of the annular valleys or rib channels 46 typically contains between four and six generally spaced apart rib supports 48 to facilitate maintaining the adjacent horizontal ribs 44 spaced from one another by a constant distance. If desired, more or less rib supports 48 can be formed within the annular valleys or rib channels 46 to assist with maintaining the spacing between the adjacent horizontal ribs 44 from one another.

The water bottle or container 2 is designed to have a top load strength of preferably between 60-100 pounds (force) (with the water bottle or container 2 empty, unsealed and vented to atmosphere), more preferably a top load strength of between about 63-75 pounds (force) (with the water bottle or container 2 empty, unsealed and vented to atmosphere), and a top load strength of between 125-250 pounds (force) (with the water bottle or container 2 filled with fluid and sealed conventionally with a cap or cover) and a lateral wall strength of preferably between 55 and 75 pounds (force). Each container 2 will have a capacity of between 2 gallons and 5 gallons, and more preferably between three gallons and four gallons.

Figure 9:
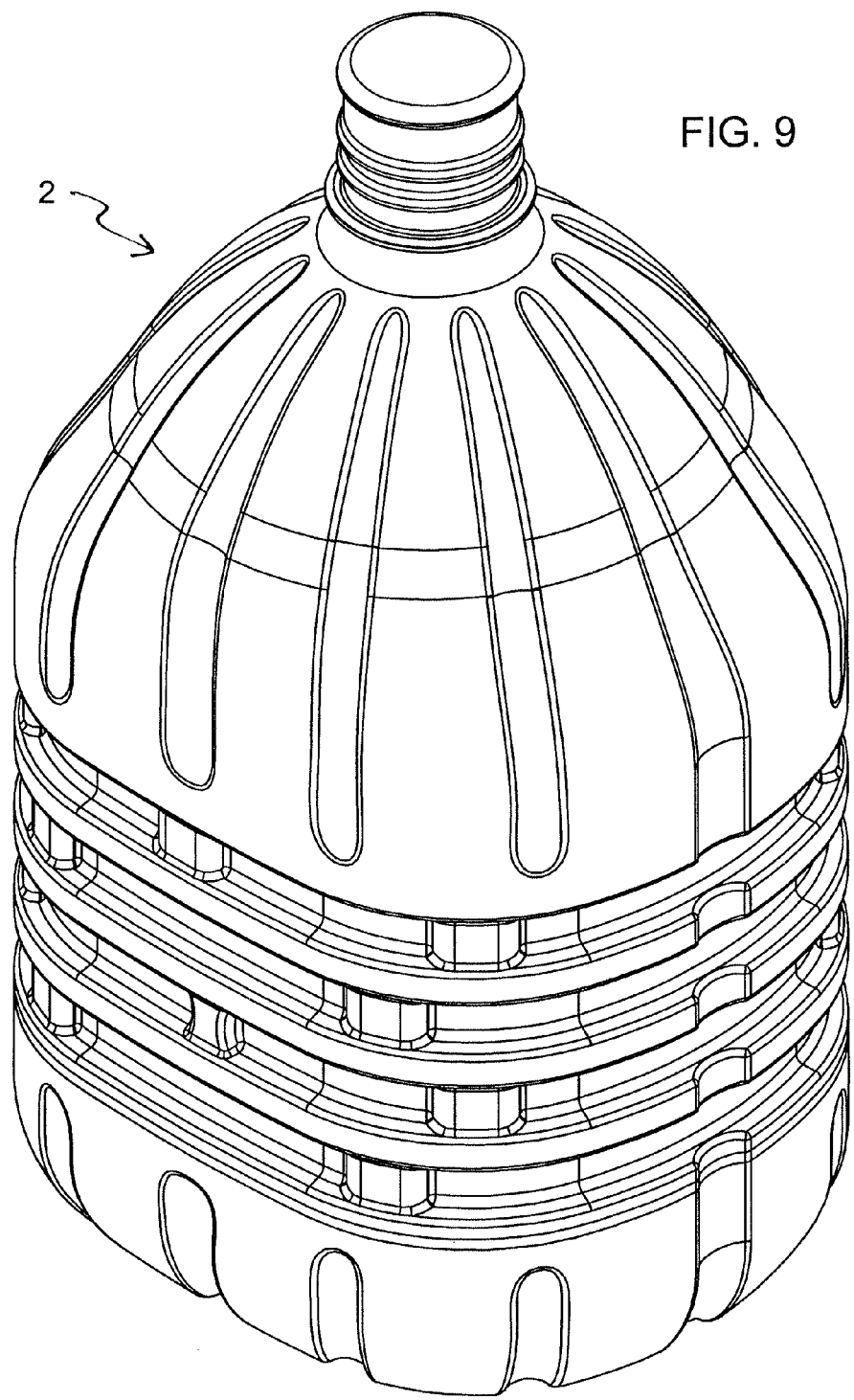
FIG. 9 is a top, front right side isometric view of a second embodiment of the container according to the invention.
Figure 10:
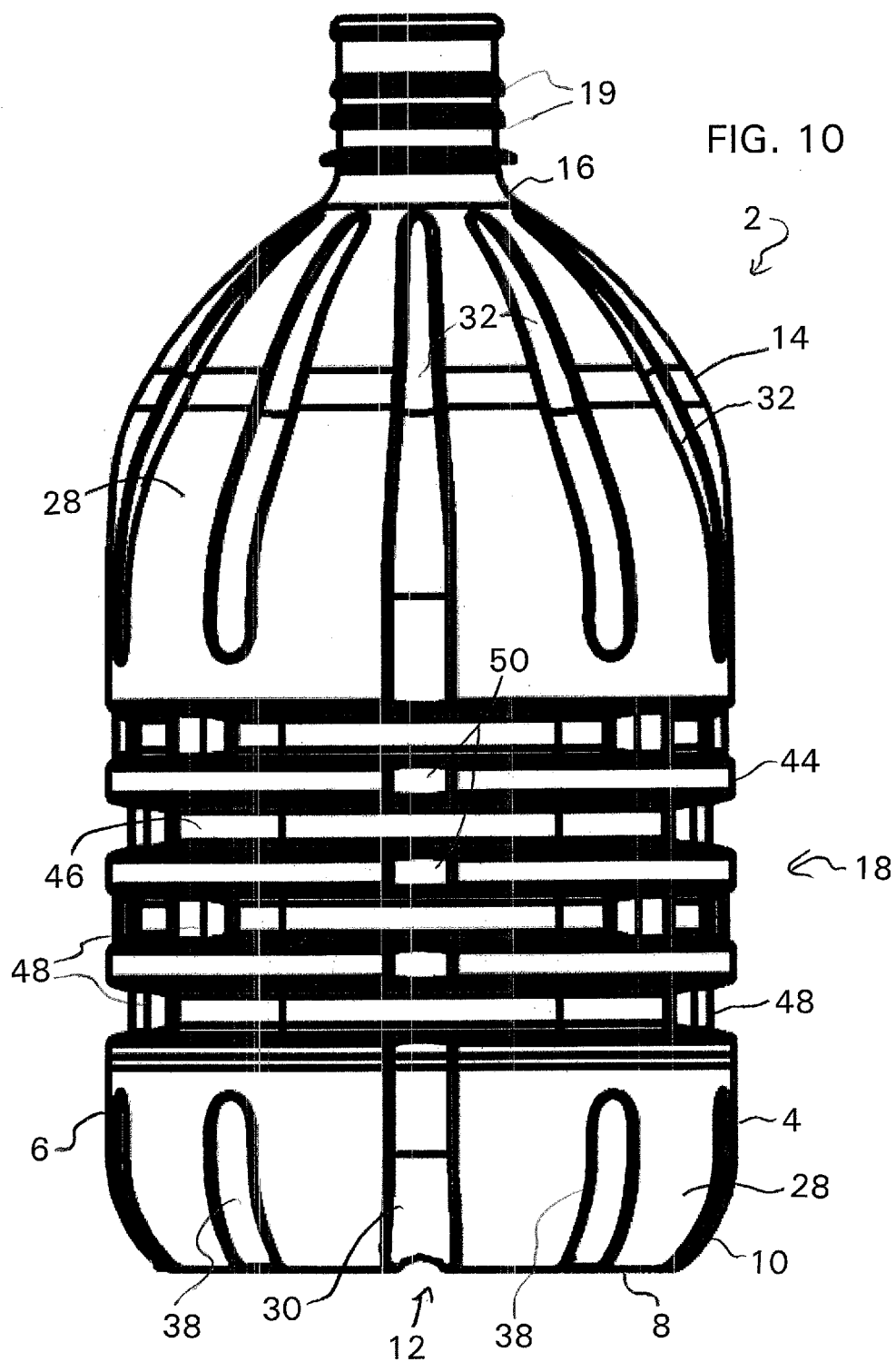
FIG. 10 is a right side elevation view of the container of FIG. 9.
Figure 11:
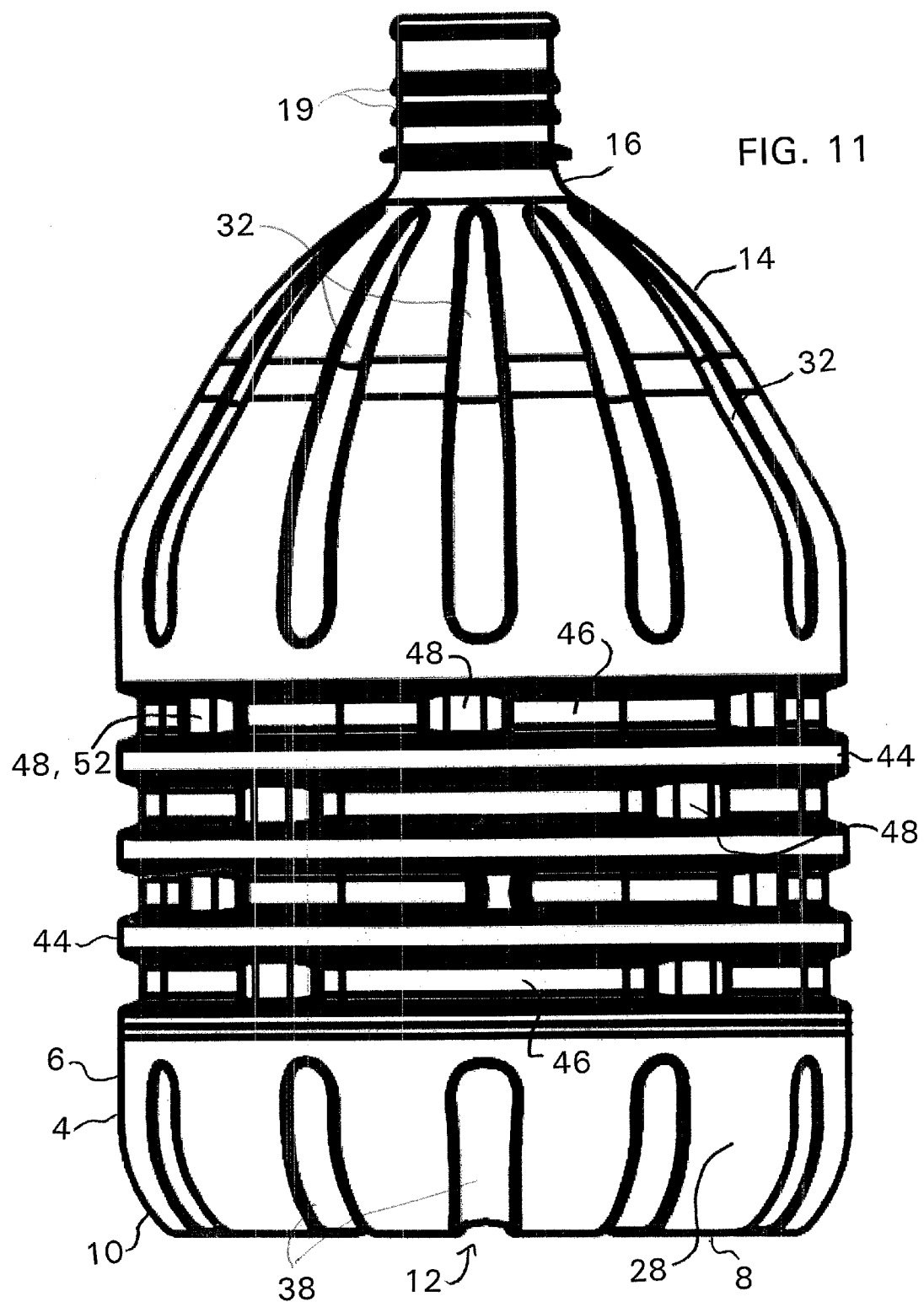
FIG. 11 is a front elevation view of the container of FIG. 9.

Briefly turning now to FIGS. 9 through 11, those Figures show a second embodiment of the water bottle or container 2. According to this embodiment, identical or similar elements are provided with identical reference numerals and the water bottle or container 2 is of a 3 gallon configuration, instead of the 4 gallon configuration discussed previously. As this embodiment is substantial identical to the previously discussed embodiment, a further detailed description concerning the same is not provided.

In the above description and appended drawings, it is to be appreciated that only the terms "consisting of" and "consisting only of" are to be construed in the limitative sense while of all other terms are to be construed as being open-ended and given the broadest possible meaning.

Since certain changes may be made in the above described water bottle or container 2 without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A multi-gallon capacity blow molded container comprising:
   a substantially rectangular bottom portion having a chime and a rectangular base, and the bottom portion having a plurality of base channels;
   a shoulder portion having a closeable neck section for facilitating filling and discharging of liquid from the container, and the shoulder portion having a plurality vertically extending shoulder channels;
   a body portion connecting the bottom portion with the shoulder portion, and the body portion having a plurality of spaced apart horizontal ribs and a plurality of annular rib channels for increasing a lateral wall strength of the container;
   wherein the container comprises at least first and second vertical primary columns which increase a top load strength of the container, and each vertical primary column commences in the shoulder portion, extends substantially continuously along the shoulder portion, vertically across only the plurality of horizontal ribs of the body portion, but not the plurality of annular rib channels, and substantially continuously along the bottom portion and terminates at the bottom portion, and each one of the horizontal ribs having first and second scalloped recesses formed therein and the first scalloped recesses are aligned with the first vertical primary column and the second scalloped recesses are aligned with the second vertical primary column so as to form substantially continuous first and second vertical primary columns which extend from the shoulder portion to the bottom portion and are only interrupted, in the body portion, by the plurality of annular rib channels.

2. The container according to claim 1, wherein the container comprises four secondary columns and each of the secondary columns is generally formed in a corner section of the container, and each one of the secondary columns generally comprises an adjacent pair of the plurality vertically extending shoulder channels of the shoulder portion, rib supports in the plurality of annular rib channels in the corner section and an adjacent pair of the plurality base channels of the bottom portion.

3. The container according to claim 1, wherein the container comprises first and second tertiary columns and each of the first and the second tertiary columns is formed by an aligned one of the plurality vertically extending shoulder channels of the shoulder portion, at least three generally aligned rib supports in the plurality of annular rib channels and an aligned one of the plurality base channels of the bottom portion.

4. The container according to claim 1, wherein the container comprises four secondary columns and each of the secondary columns is generally formed in a corner section of the container, and each one of the secondary columns generally comprises an adjacent pair of the plurality vertically extending shoulder channels of the shoulder portion, a rib support located in each of the plurality of annular rib channels in each of the corner sections and an adjacent pair of the plurality base channels of the bottom portion; and first and second tertiary columns and each of the first and the second tertiary columns is formed by an aligned one of the plurality vertically extending shoulder channels of the shoulder portion, four generally aligned rib supports in the plurality of annular rib channels and an aligned one of the plurality base channels of the bottom portion.

5. The container according to claim 1, wherein the shoulder portion comprises twelve substantially vertically extending shoulder channels, and each one of the twelve substantially vertically extending shoulder channels commences directly adjacent the neck section and extends generally vertically downward toward the body portion.

6. The container according to claim 1, the bottom portion comprises twelve radially extending base channels and each one of the twelve extending base channels commences within the chime and extends generally radially therefrom toward a lower region of the body portion and then extends vertically toward the body portion.

7. The container according to claim 1, wherein the first and the second vertical primary columns are radiussed features which each have a radius of curvature between 0.500 inches and 1.000 inches.

8. The container according to claim 1, wherein a corresponding annular rib channel is located between and separates each pair of adjacent horizontal ribs from one another.

9. The container according to claim 8, wherein the container comprises seven annular rib channels and a horizontal rib is located between and separates each adjacent pair of annular rib channels from one another, and each one of the horizontal ribs and the annular rib channels assist with providing the container with increased lateral wall strength so as to resist collapse of the container when an internal vacuum is created therein.

10. The container according to claim 2, wherein the rib supports, in the plurality of annular rib channels, at offset but at least partially vertically overlap and are aligned with one another in the corner sections.

11. The container according to claim 2, wherein the rib supports, in the plurality of annular rib channels, are generally vertically aligned with one another in the corner sections.

12. The container according to claim 2, wherein the rib supports, in the plurality of annular rib channels, are generally stagger with respect to one another in the corner sections and are located between an adjacent pair of the plurality vertically extending shoulder channels of the shoulder portion and an adjacent pair of the plurality base channels of the bottom portion.

13. The container according to claim 1, wherein each of the plurality of annular rib channels has between four and eight spaced apart rib supports.

14. The container according to claim 1, wherein the container has a capacity of between 2 gallons and 5 gallons, a top load strength of between 60-100 pounds, with the container empty and unsealed, between 125-250 pounds, with the container filled with a fluid and sealed, and a lateral wall strength of between 55 and 75 pounds.

15. The container according to claim 1, wherein each annular rib channel has between four and six rib supports.

16. The container according to claim 1, wherein each scalloped recess which has a radius of curvature between 0.500 inches and 1.000 inches.

17. The container according to claim 1, wherein each of the plurality of annular rib channels comprises at least a pair of rib supports, and the pair of rib supports, of each of the plurality of annular rib channels, are spaced so as to be offset with respect to one another and both first and the second scalloped recesses of the container.

18. The container according to claim 17, wherein each rib support protrudes from a respective annular rib channel, and each rib support is formed integral with the respective annular rib channel so as to interconnect a sidewall of adjacent pairs of the horizontal ribs with one another and thereby resist vertical collapse of the container.

19. A multi-gallon capacity blow molded container comprising:

a substantially rectangular bottom portion having a chime and a rectangular base, and the bottom portion having a plurality of base channels;

a shoulder portion having a closeable neck section for facilitating filling and discharging of liquid from the container, and the shoulder portion having a plurality vertically extending shoulder channels;

a body portion connecting the bottom portion with the shoulder portion, and the body portion having a plurality of spaced apart horizontal ribs and a plurality of annular rib channels for increasing a lateral wall strength of the container;

wherein the container comprises at least first and second vertical primary columns which increase a top load strength of the container, and each vertical primary column commences in the shoulder portion, extends substantially continuously along the shoulder portion, vertically across only the plurality of horizontal ribs of the body portion, but not the plurality of annular rib channels, and substantially continuously along the bottom portion and terminates at the bottom portion, and each one of the horizontal ribs has first and second scalloped recesses formed therein and the first scalloped recesses are aligned with the first vertical primary column and the second scalloped recesses are aligned with the second vertical primary column so as to form substantially continuous first and second vertical primary columns which extend from the shoulder portion to the bottom portion and are only interrupted, in the body portion, by the plurality of annular rib channels, and each of the plurality of annular rib channels comprises at least four rib supports, one of the at least four rib supports, in each of the plurality of annular rib channels, is located in each corner section of the body section to provide top load support for the container in the corner sections, and the rib supports located in adjacent annular rib channels, in the corner sections, are staggered with respect to one another but are at least still partially vertically aligned with one another in the corner sections.

20. A multi-gallon capacity blow molded container comprising:
- a substantially rectangular bottom portion having a chime and a rectangular base, four corner sections and the bottom portion having a plurality of base channels;
- a shoulder portion having a closeable neck section for facilitating filling and discharging of liquid from the container, and the shoulder portion having a plurality vertically extending shoulder channels;
- a body portion connecting the bottom portion with the shoulder portion, and the body portion having a plurality of spaced apart horizontal ribs and a plurality of annular rib channels for increasing a lateral wall strength of the container;
- wherein the container comprises first and second vertical primary columns which increase a top load strength of the container, and each vertical primary column commences in the shoulder portion, extends substantially continuously along the shoulder portion, vertically across only the plurality of horizontal ribs of the body portion, but not the plurality of annular rib channels, and substantially continuously along the bottom portion and terminates at the bottom portion, and each one of the horizontal ribs has first and second scalloped recesses formed therein and the first scalloped recesses are aligned with the first vertical primary column and the second scalloped recesses are aligned with the second vertical primary column so as to form substantially continuous first and second vertical primary columns which extend from the shoulder portion to the bottom portion and are only interrupted, in the body portion, by the plurality of annular rib channels;
- at least one vertical column in the shoulder portion which extends toward each one of the four corner sections;
- at least one vertical column in the bottom portion which extends toward each one of the four corner sections;
- each of the plurality of annular rib channels comprises at least four rib supports, one of the at least four rib supports, in each of the plurality of annular rib channels, is located in each corner section of the body section to provide top load support for the container in the corner sections, and the rib supports located in adjacent annular rib channels, in the corner sections, are staggered with respect to one another but are at least still partially vertically aligned with one another in the corner sections; and
- the vertical columns in the shoulder portion which extends toward each one of the four corner sections, the vertical columns in the bottom portion which extend toward each one of the four corner sections and the staggered rib supports, located in the corner sections, form secondary columns which combine with one another to provide secondary top load support for the container.

* * * * *